(12) United States Patent
Hunter (10) Patent No.: US 7,680,745 B2
(45) Date of Patent: Mar. 16, 2010

(54) AUTOMATIC CONFIGURATION AND CONTROL OF DEVICES USING METADATA

(75) Inventor: Jim Hunter, San Jose, CA (US)

(73) Assignee: 4HomeMedia, Inc., Sunnyvale, CA (US)

( * ) Notice: Subject to any disclaimer, the term of this patent is extended or adjusted under 35 U.S.C. 154(b) by 525 days.

(21) Appl. No.: 11/699,751

(22) Filed: Jan. 29, 2007

(65) Prior Publication Data

US 2008/0183651 A1  Jul. 31, 2008

(51) Int. Cl.
G06F 15/18 (2006.01)
(52) U.S. Cl. ....................................................... 706/12
(58) Field of Classification Search ................... 706/12
See application file for complete search history.

(56) References Cited

U.S. PATENT DOCUMENTS

| | | | | |
|---|---|---|---|---|
| 6,491,217 | B2 * | 12/2002 | Catan | 235/375 |
| 6,571,240 | B1 * | 5/2003 | Ho et al. | 707/5 |
| 6,616,047 | B2 * | 9/2003 | Catan | 235/472.02 |
| 6,676,014 | B2 * | 1/2004 | Catan | 235/375 |
| 6,983,320 | B1 * | 1/2006 | Thomas et al. | 709/224 |
| 7,398,261 | B2 * | 7/2008 | Spivack et al. | 706/55 |
| 7,584,208 | B2 * | 9/2009 | Spivack et al. | 707/103 R |
| 2003/0040812 | A1 * | 2/2003 | Gonzales et al. | 700/19 |
| 2005/0055108 | A1 * | 3/2005 | Gonzales et al. | 700/22 |
| 2008/0140642 | A1 * | 6/2008 | Messing et al. | 707/5 |

OTHER PUBLICATIONS

Automatic document metadata extraction using support vector machines, Hui Han, C. Lee Giles, Eren Manavoglu, Hongyuan Zha, Zhenyue Zhang, Edward A. Fox, May 2003 JCDL '03: Proceedings of the 3rd ACM/IEEE-CS joint conference on Digital libraries, Publisher: IEEE Computer Society.*
Web site auditing: first step towards re-engineering, Yogesh Deshpande, Anupama Chandrarathna, Athula Ginige, Jul. 2002 SEKE '02: Proceedings of the 14th international conference on Software engineering and knowledge engineering, Publisher: ACM.*

* cited by examiner

*Primary Examiner*—Michael B Holmes
(74) *Attorney, Agent, or Firm*—Brian N. Young; Fountainhead Law Group PC (57) ABSTRACT

Particular embodiments generally relate to automatically controlling an item. For example, items may include electronic devices, such as televisions, lights, etc, and/or virtual devices, such as applications, etc. In one embodiment, items may be configured using metatags. When a device is connected for operation, one or more metatags for the device are received. A metatag be used to classify the device. For example, the metatag may indicate uses, locations, connections, etc. The use of device (e.g., pathway, reading, etc.) classifies the item in way it can be used. For example, a user may use a pathway light in different ways, such as the user may turn on all lights with the pathway metatag at night. The location indicates the location of the item, such as in the living room, bedroom, etc. The connections indications a type of item, such as a bedroom light, lamp, TV, etc.

19 Claims, 9 Drawing Sheets

AUTOMATIC CONFIGURATION AND CONTROL OF DEVICES USING METADATA

BACKGROUND

Particular embodiments generally relate to automatic control of devices.

Many different devices or other items may be controlled automatically. For example, a television, DVD player, lights, and other electronic devices may be controlled in a household. In one example, lights may be programmed to turn on at a certain time or a thermostat configured to change a regulated temperature at a certain time. However, such control systems can quickly grow complicated as the number of controlled devices increases and the conditions or factors to which a control system must react also increase. Initial configuration can also be difficult as, for example, each item may have a different configuration process. Further, when new devices replace existing devices, the new devices and the control system may need to be reconfigured in order to be compatible.

SUMMARY

Particular embodiments generally relate to associating metadata, such as short names or "metatags," with an item so that the item can be more flexibly controlled. A particular embodiment of the invention uses metatags to describe controllable household devices such as, e.g., lights, appliances, entertainment systems, etc. Metadata can be used to describe an item so that control of all items with a particular metatag can be performed at a conceptual level rather than relying on mechanical, mathematical or logical specifications. For example, if lights are associated with either an "inside" or "outside" metatag then implementing a command to "turn off all outside lights" is simplified. More than one metatag can be used with a particular item so that, for example, a light that is outside and next to a walkway might be tagged with both "outside" and "walkway."

Many different types or classes of metadata can be used. For example, rather than use a metatag that describes merely a physical location of a light, a light can be tagged with "reading" or "dinner" to indicate that it is used for such purposes. Scenes can be defined that include a set of rules or other criteria that determine how an item is controlled. Item control can be, e.g., turning a device on or off, adjusting the intensity of a light, changing the volume of audio playback, etc. The scenes may include triggers that cause a specific item behavior based on an event or condition such as time of day, user presence, outside darkness, a user's desired mood, etc. For example, a scene called "walkway lighting" may be defined to activate all items with the metatag, "pathway." Items that might have the metatag "pathway" could include outside sidewalk and patio lighting devices, interior hallway night lights, etc. Devices are controlled automatically based on scene rules and item metadata.

Use of metadata can simplify the configuration of new items when the items are installed. For example, when new lights are connected to the network, the lights do not have to be specifically configured to perform desired actions. Previously defined configurations can be automatically applied to new devices if the devices have recognized metatags. In one example, newly installed lights may be designated with the metatag, "pathway," and they will automatically act as other pathway lights have been previously acting. This simplifies the configuration process and allows powerful configuration and control of items.

When a device is connected for operation, one or more metatags for the device can be automatically presented to the control system. The metatags or other metadata can be set by a manufacturer of the device, set by a user or purchaser, or can be obtained or set by another party such as by obtaining the metatags from the Internet.

A further understanding of the nature and the advantages of particular embodiments disclosed herein may be realized by reference of the remaining portions of the specification and the attached, drawings.

DETAILED DESCRIPTION OF EMBODIMENTS

Figure 1:
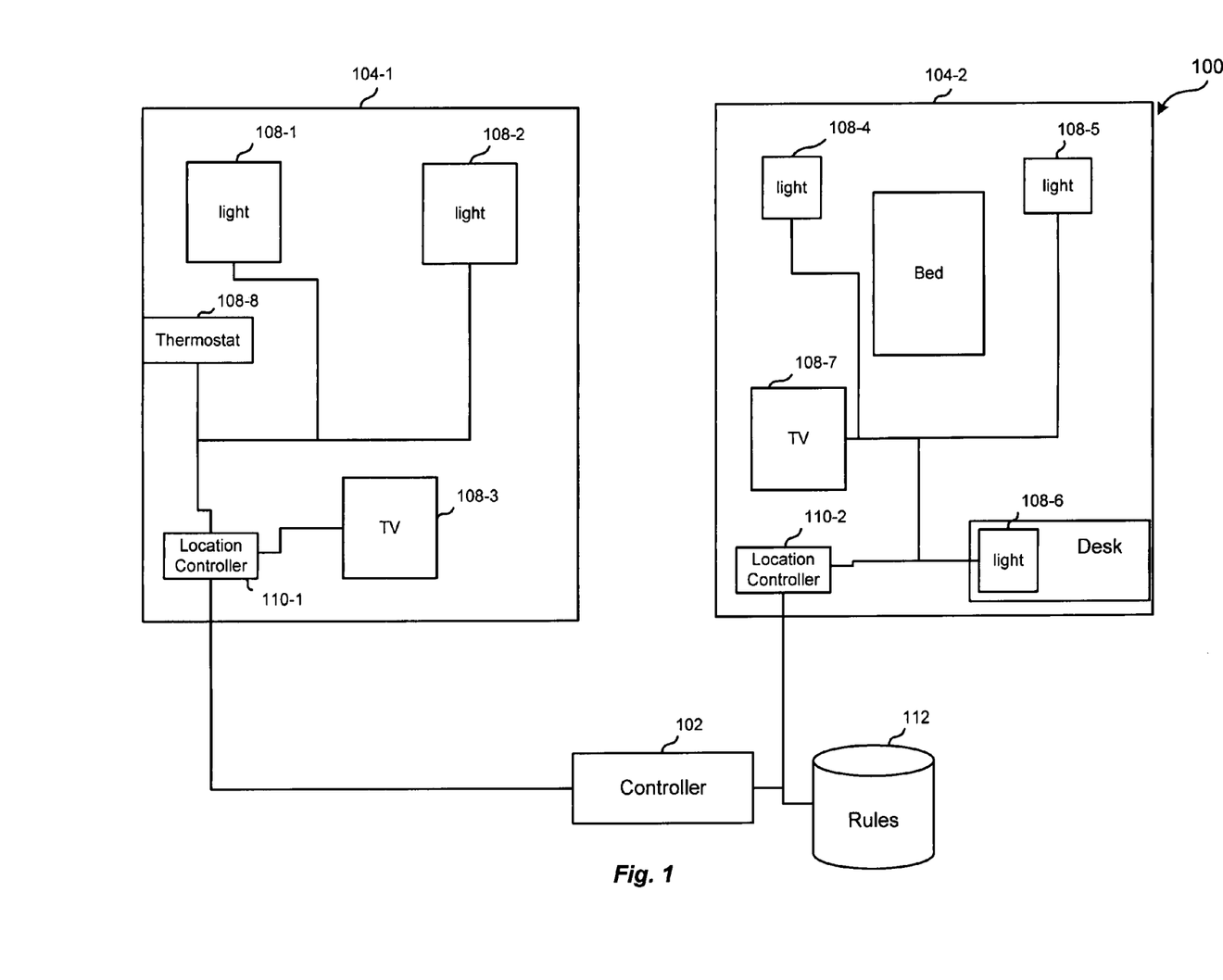
FIG. 1 depicts a simplified system according to one embodiment.

FIG. 1 depicts a simplified system 100 according to one embodiment. As shown, controller 102, locations 104, and rules storage 106 are provided. Locations 104 also include items 108, and location controller 110.

Controller 102 is configured to control items 108 in locations 104. A location may be any area, such as a room, hallway, etc. System 100 may be broken up into locations 104. For example, the locations may be found in a house, business, or any other area. Although specific locations 104 are described, it will be understood that any number of locations may be controlled using controller 102.

Controller 102 may include hardware, software, or any combination thereof to cause actions to be performed with items 108. For example, items 108 may be controlled by turning them off, turning them on, etc. In one embodiment, controller 102 may communicate through a network to location controllers 110. Location controllers 110 may then cause the actions to be performed with items 108 that are in a specific location. For example, controller 110-1 may be able to control items 108-1-108-7.

Items 108 may be any items that may be physical or virtual. For example, a physical device may be an actual device that is physically located in location 104, such as lights, televisions, appliances, and thermostats. Also, virtual devices may be controlled, such as applications, content, music, content feeds, etc. The devices shown are physical devices, but it will be understood that virtual devices may also be controlled.

Metatags may be used to classify items. A metatag may be any information that describes the classification. For example, metatags may be included for uses, locations, connections, scenes, etc.

The metatags may then be used to control items 108 using rules. In one example, a user may configure the rules for a metatag. In other embodiments, metatags and their associated rules may come prepackaged by an entity. For example, a service may predetermine metatags with their associated rules and download them to rules storage 106.

The rules may specify triggers that perform an action when a condition is satisfied. For example, a rule may specify that items with the metatag "light" and "pathway" be turned to low and items with the metatag "television" and "living room" may be turned on after 6 pm. The rules may be included in a scene, which may be a collection of rules. For example, a scene may be a "safety" scene, which specifies turning on all items 104 that are designated as pathway lights when an alarm is activated.

FIGS. 2A-2E show examples of interfaces that may be used to configure an item 108 according to one embodiment. Although these specific interfaces are shown, it should be apparent that other interfaces may be used.

Figure 2A:
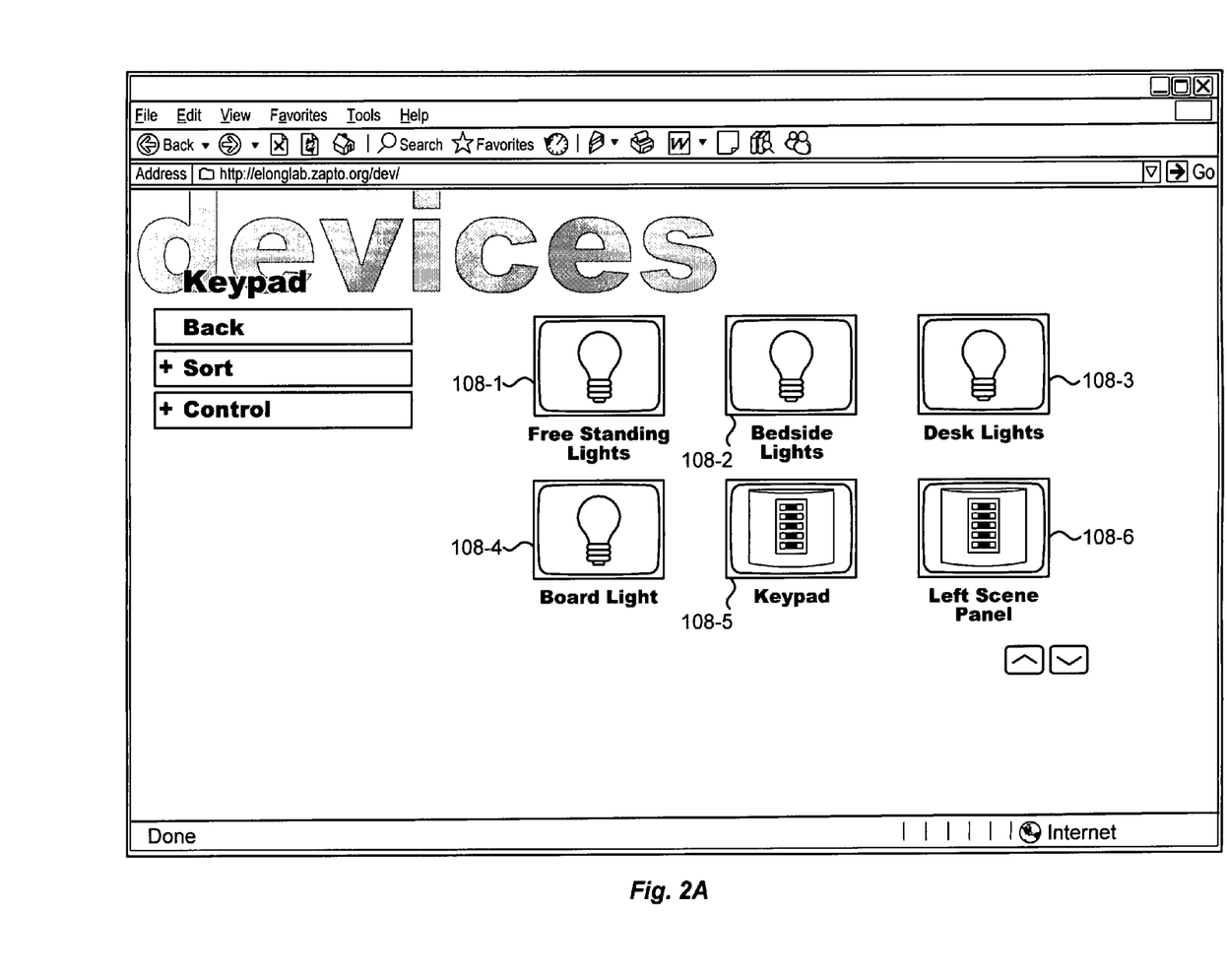
FIGS. 2A-2E show examples of interfaces that may be used to configure an item according to one embodiment.

In FIG. 2A, a number of items 108 are shown. These items 108 can be configured with metatags. Items 108 include freestanding lights 108-1, bedside lights 108-2, desk lights 108-3, board lights 108-4, keypad 108-5, and left scene panel 108-6. Items 108 may be selected and a menu may be displayed in which metatags may be selected for each item 108. In one embodiment, these items 108 are items that are connected to controller 102. A user can configure these items 108. Other items may also be configured but are not shown. When a user physically connects an item 108 to a control system, such as by coupling the item to a digital network and to location controller 110, the item appears as a graphical icon on this interface for configuration. When the user selects an icon corresponding to a device (e.g., with a mouse and pointer, remote control device, etc.), an editing screen appears.

Figure 2B:
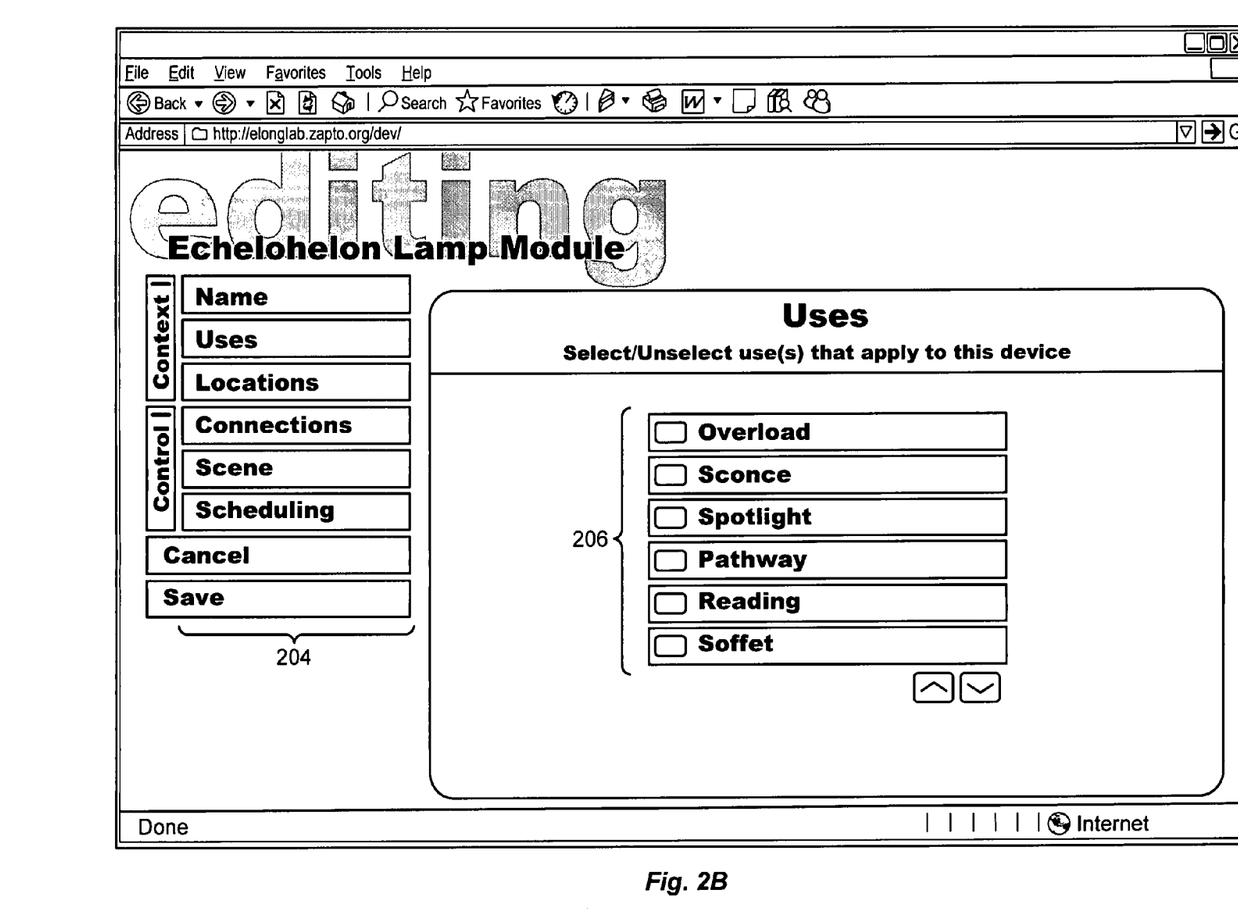

FIG. 2B shows menu 202 of an example of categories of metatags according to one embodiment. Menu 204 shows different configuration parameters that may be configured. For example, a name, use, location, connection, scene, and scheduling may be configured. It should be noted that items 108 may be preconfigured. For example, a type of item may be detected and it may be preconfigured with metatags and other information. This is described in more detail below.

FIG. 2B shows a menu 206 of different metatags for uses according to one embodiment. The context and control may be configured. The context is information on the item itself. For example, the name, use, and location may be configured. Although these examples of context are provided, it will be understood that other metatags may be used. The control is information that is used to control the item.

The name may be a name that is assigned for item 108 and may be typed in. This may be used to identify different items uniquely.

The use may be how item 108 may be used. As shown, overhead, sconce, spotlight, pathway, reading, and soffet are shown. These metatags classify possible uses. For example, pathway may indicate that a light is a reading light. In this case, it may be used to illuminate areas that may be used for reading at certain times. Also, any number of metatags may be selected.

Figure 2C:
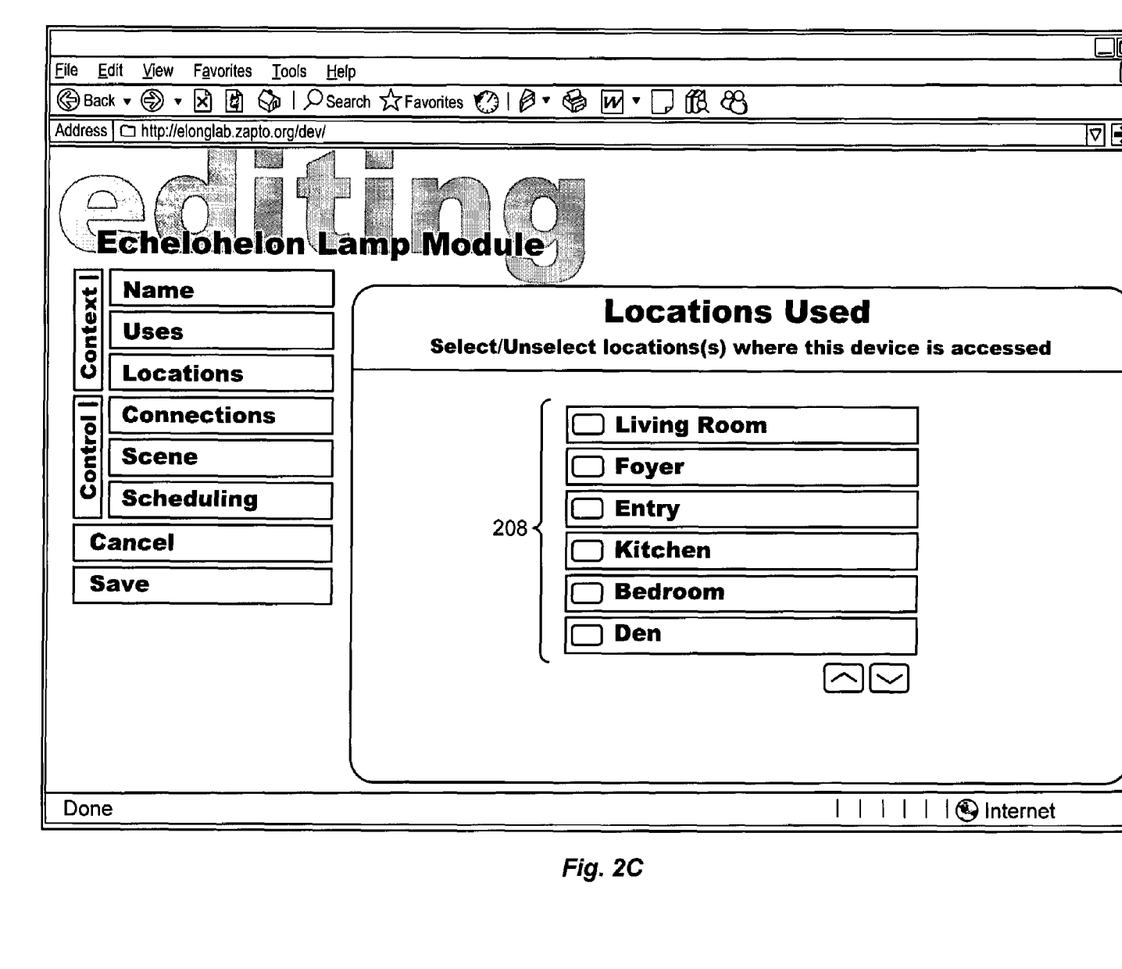

FIG. 2C shows a menu 208 of different metatags for locations used according to one embodiment. The location may be where item 108 is located. As shown, living room, foyer, entry, kitchen, bedroom, and den metatags are shown. These metatags classify possible locations. For example, living room may indicate that a light is in the living room.

Figure 2D:
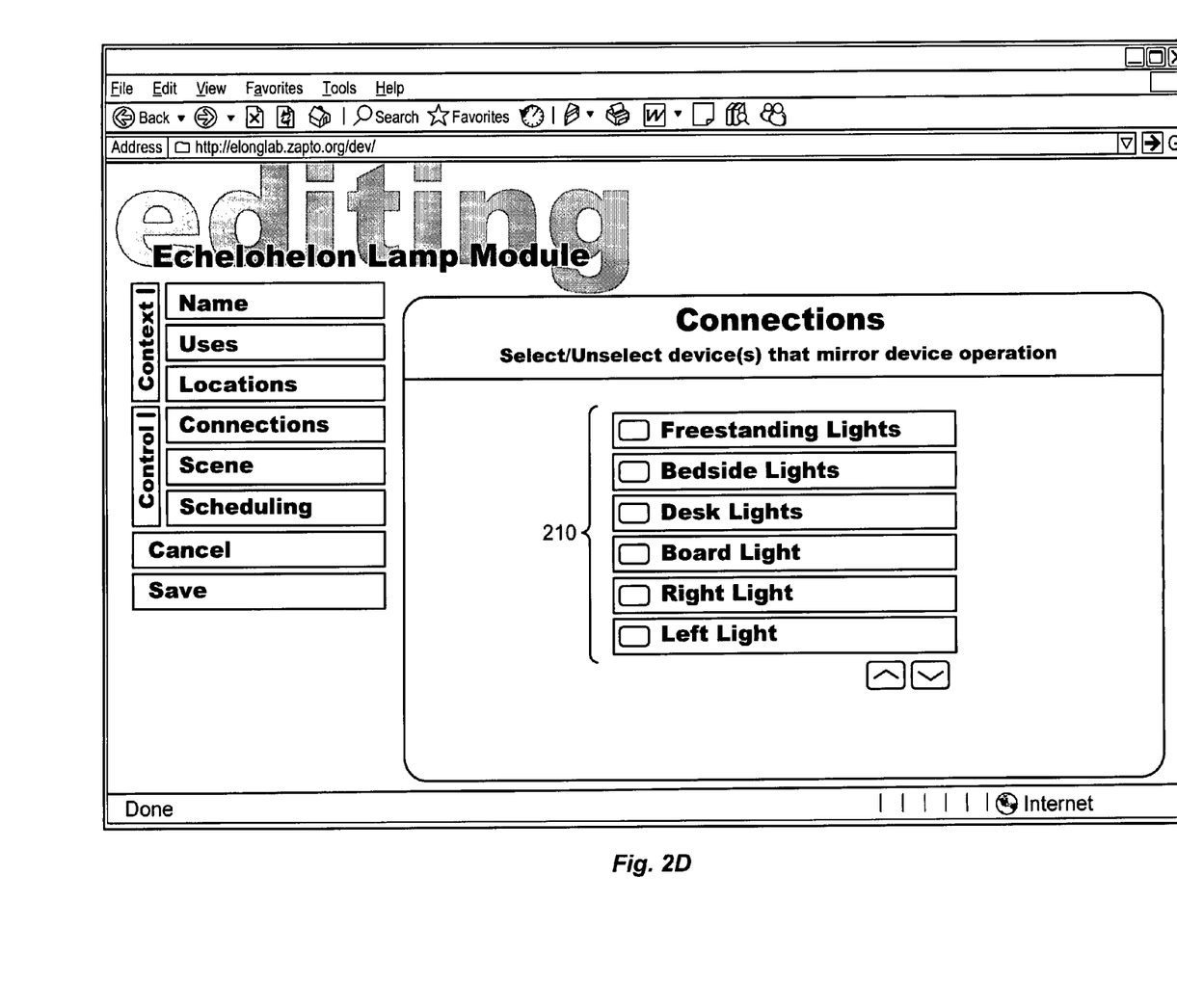

FIG. 2D shows a menu 210 of different metatags for connections according to one embodiment. The connection may be a type of item 108. As shown, freestanding lights, bedside lights, desk lights, board lights, right light, left light metatags are shown. These metatags classify possible devices in which item 108 may similarly operate. For example, a light may operate like a bedside light. In this case, the settings and features of item 108 may be determined from the metatag selected. For example, a bedside light may have a low and high setting. Also, if the item was a TV, the settings for a TV (e.g., volume, on/off, picture settings, etc.) may be associated with the item if a TV metatag is selected.

Figure 2E:
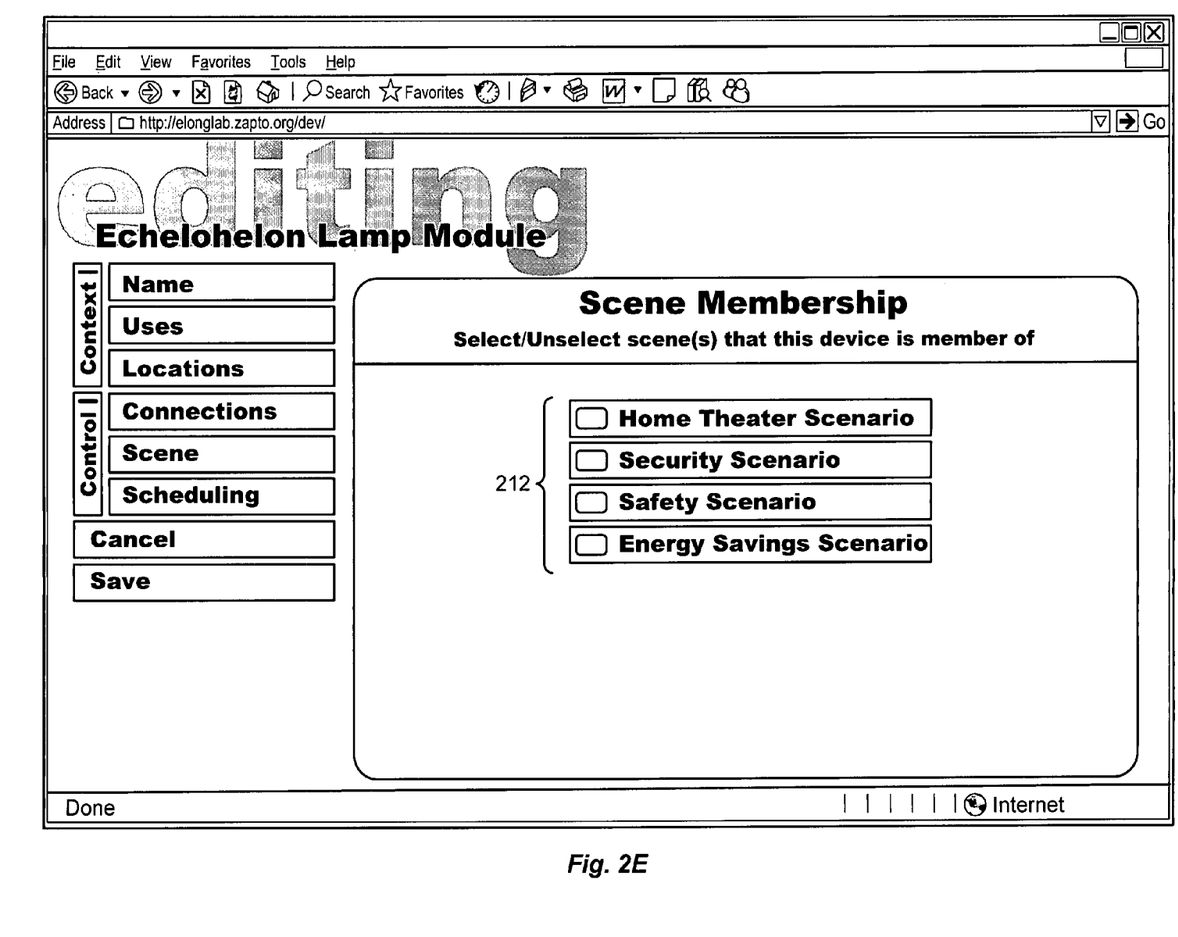

FIG. 2E shows a menu 212 of different metatags for scene membership according to one embodiment. The scene may be rules on how to control items 108. As shown, scenes include home theatre, security, safety, and energy savings. These metatags classify possible scenes in which item 108 may be included. For example, a light may be included in the security scene. In this case, it may be turned on when a security breach is determined. For example, the rule may be when an alarm is sounded, turn on all items 108 with a pathway metatag and light metatag. Other more complicated scenes may be appreciated. A scene may include triggers and rules for one or more metatags that describe the control of items using rules. For example, a scene may include metatags to control the use of items 108. Thus, items 108 may be associated with a scene and/or multiple metatags. For example, when light 108-1 is connected to location controller 110-1 and controller 102, it may be configured with the metatags spotlight (use metatag), living room (location metatag), free standing light (connections metatag), home theatre (scene metatag) and energy conservation (scene metatag).

Rules for a scene may then be configured. These rules may be configured by a user or may be predetermined. For example, for the scene home theatre, the trigger may detect the powering on of a DVD player. Thus, when controller 110-1 detects the powering on of a DVD player, it may be signaled to controller 102, which can then invoke the home theatre scene.

The home theatre scene may include the following rules for metatags:

Spotlight/free standing lights/living room -> Low power
Reading/desk lights/bedroom -> off
Reading/bed lights/bedroom -> off
TV/living room-> On
Heat/living room-> 70 degrees For example, item 108 with the metatags of spotlight, free standing light and living room will be turned to a low power. Thus, a free standing spotlight in the living room is turned to a low power. In one example, items 108-1 and 108-2 may be turned to a low power.

Also, item 108 with the metatags of reading, desk lights, and bedroom may be turned off. Also, items 108 with metatags of reading, bed lights, and bedroom are turned off. In this case, reading lights, such as lights 108-4, 108-5, and 108-6 may be turned off. This may be because the living room is being used and the lights in the bedroom should be turned off to conserve energy.

Further, item 108-3 may be configured with TV and living room and it is turned on. Additionally, item 108-8 is set to 70 degrees.

Other metatags may also be used. For example, a metatag may be energy conservation, which maintains the energy use of all items 108 at 70 percent of a certain threshold. Further, a metatag may be Christmas lights, which make lights perform as if they are Christmas lights. Accordingly, when it is Christmas time, a metatag for a light may be changed to the metatag "Christmas lights" and it will perform in such a way as desired during Christmas time.

Accordingly, items 108 may be associated with metatags and automatically controlled to perform actions. Items 108 do not need to be programmed themselves to perform the actions. Rather, by virtue of associating metatags with the item, the control may be automatic.

Figure 3:
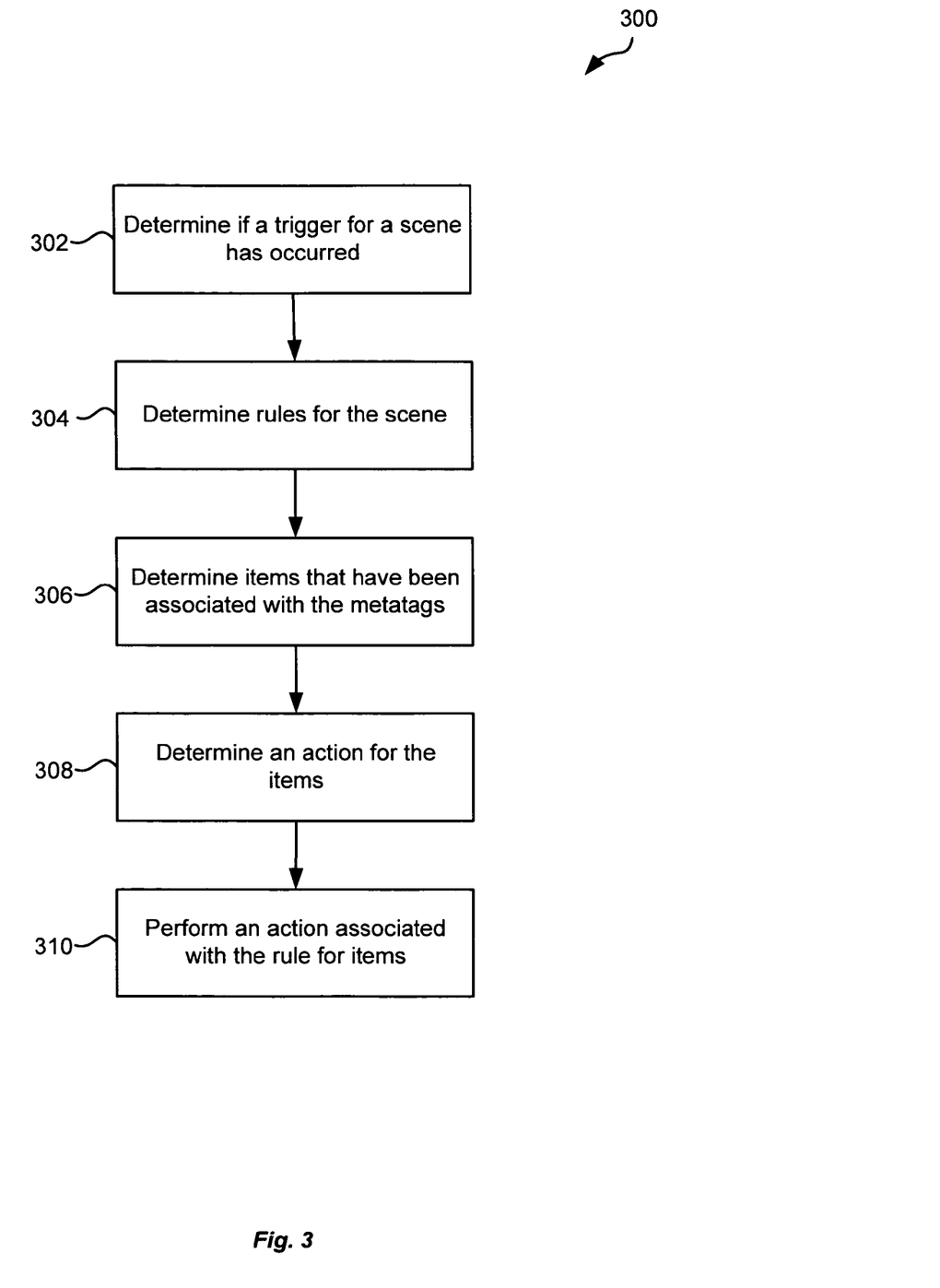
FIG. 3 depicts a simplified flowchart for performing actions with items 108 according to one embodiment.

FIG. 3 depicts a simplified flowchart 300 for performing actions with items 108 according to one embodiment. Step 302 determines if a trigger for a scene has occurred. For example, controller 102 may determine a scene that needs to be performed when an event occurs. In this case, the scene home theatre may be determined when the DVD player is turned on.

Step 304 then determines rules for the scene. The rules include metatags for the scene. For example, each rule includes a number of metatags.

Step 306 determines items 108 that have been associated with the metatags. For example, queries may be run to determine which items 108 are associated with which metatags. This query may be run in real-time when the rule is triggered. Also, the query may be previously run, such as when the item is configured. For example, the query may determine all items with the TV metatag. Also, if the home theatre metatag was selected during the configuration process, then items 108 may be queried to determine which items included the metatag home theatre.

Step 308 then determines an action for items 108. Step 310 then performs an action associated with the rule for items 108. For example, the TV may be turned on, the thermostat set to 70 degrees and the lights in the living room turned on while the lights in the bedroom are turned off.

In one embodiment, controller 102 may communicate the actions to perform to location controller 110-1. Location controller 110-1 may then communicate through the network to cause items 108 to perform the determined action. For example, location controller 110-1 may communicate with lights 108-1 and 108-2 to turn them to a low power. This may be performed though any network, such as a wireless network, wired network, etc. Although lines have been shown connecting items and location controller 110 and controller 102, it will be understood that wireless and/or wired connections may be used.

Location controller 110-1 may be able to control lights 108 in any way. For example, location controller 110 may send signals to lights 108 to cause them to adjust their power.

In other examples, in location 104-2, lights 108-1 and 108-5 may be bedside lights and light 108-9 may be a desk light on a desk 108-6. The energy conservation metatag may specify that desk light 108-9 is turned off and bedside lights are turned on. In this case, bedside lights 108-4 and 108-5 are turned on, but desk light 108-9 is turned off. Thus, individual items that may be of the same type (e.g., lights) may also be controlled as long as they are identified. In this case, a finer degree of identification may be used. For example, instead of identifying a rule for lights, rules for bedside lights and desk lights may be provided. This allows further customization of control for items.

Using metatags, new devices that are connected to controller 102 and/or location controller 110 may be automatically configured to operate according to a scene. For example, once metatags are associated with the item, then that item 108 may begin to operate as defined in the rules for the metatags.

Figure 4:
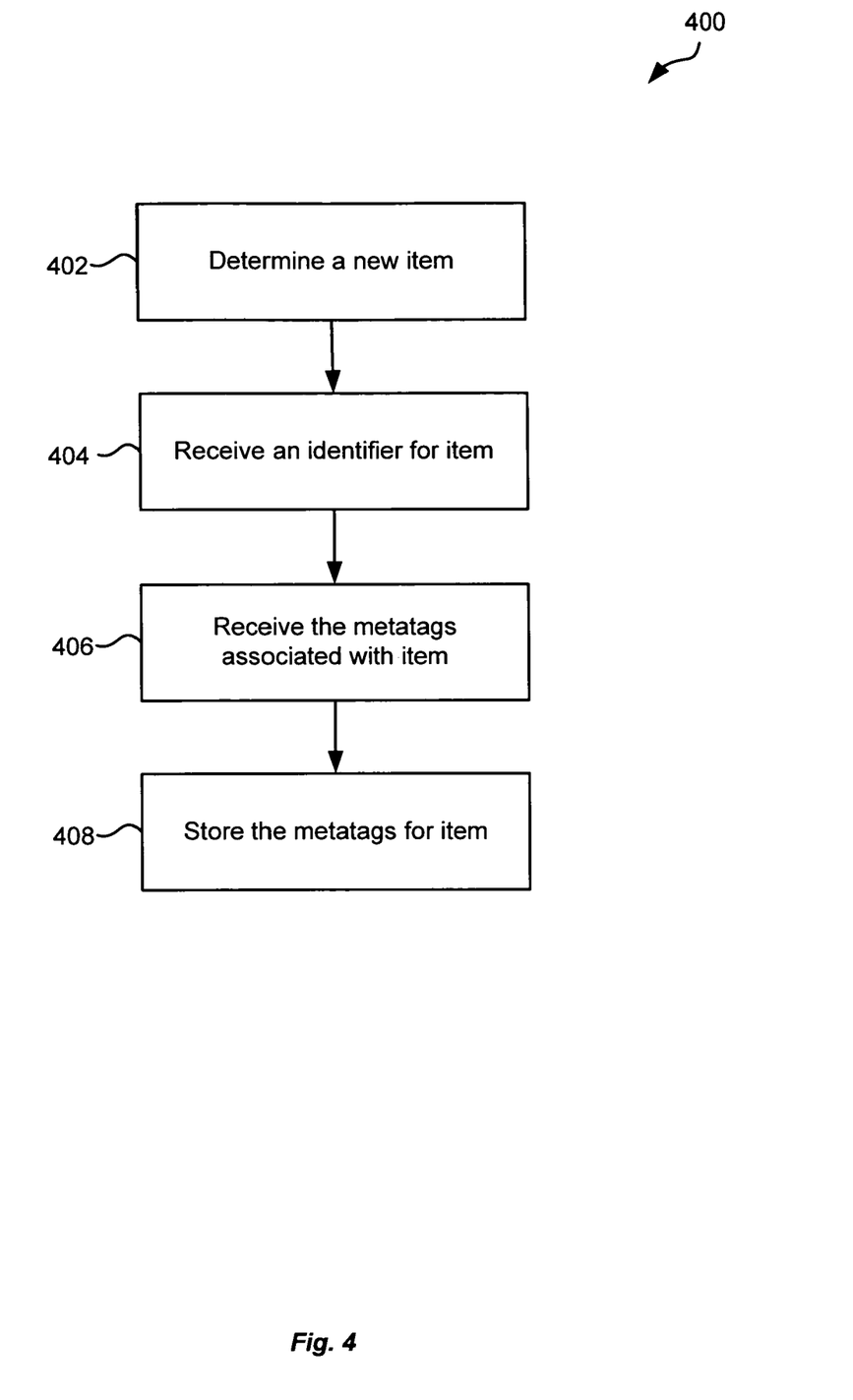
FIG. 4 depicts a simplified flowchart for configuring a newly connected device according to one embodiment.

FIG. 4 depicts a simplified flowchart 400 for configuring a newly connected device according to one embodiment. Step 402 determines a new item 108. For example, item 108-1 may be connected to the network through location controller 110-1. This connection may be made by wireless, wired, or by any other connection. In one embodiment, location controller 110-1 may detect a device through a Bluetooth connection. For example, television 108-3 may have its Bluetooth connection active and location controller 110-1 can detect active items with active Bluetooth connections. Location controller 110-1 may then identify item 108 to controller 102. Also, a user may use a computer to send an indication of a new item 108. This configuration may be performed using a portal that configures metatags for the user. Also, other methods may be provided, such as calling an operator, using an interactive voice response system, etc.

Step 404 then receives an identifier for item 108. For example, the identifier may be a bar code, RFID, or any other identifier. This may identify the type of device, such as a TV, light, etc., which may guide which user interfaces may be shown to a user.

The metatags may be intelligently determined. For example, if the identifier indicates item 108 is a TV, then certain metatags are preselected. A user can also change the preselections. Further, other contextual information may be used, such as if item 108 is connected to location controller 110-1, then it is assumed to be in the living room, and that metatag is preselected. Further, different combinations of metatags may be pre-configured for a user. For example, the above combination and also the combination of spotlight, pathway, and board light are offered. This may simplify the configuration.

Also, if item 108 does not exactly match a known item, an estimation of what are appropriate metatags may be determined. For example, an interactive session is being performed through a portal to set up the item, then a question as to how the item is going to be used may be posed. A question and answer session may then be performed.

Step 406 receives the metatags associated with item 108. The metatag does not have to be sent from item 108 (but it can). For example, a user may use a computer to send a metatag to controller 102.

Step 408 stores the metatags for item 108. The metatags may be stored locally, such as in storage 112. Also, the metatags may be stored remotely on a server, on controller 102, etc.

Figure 5:
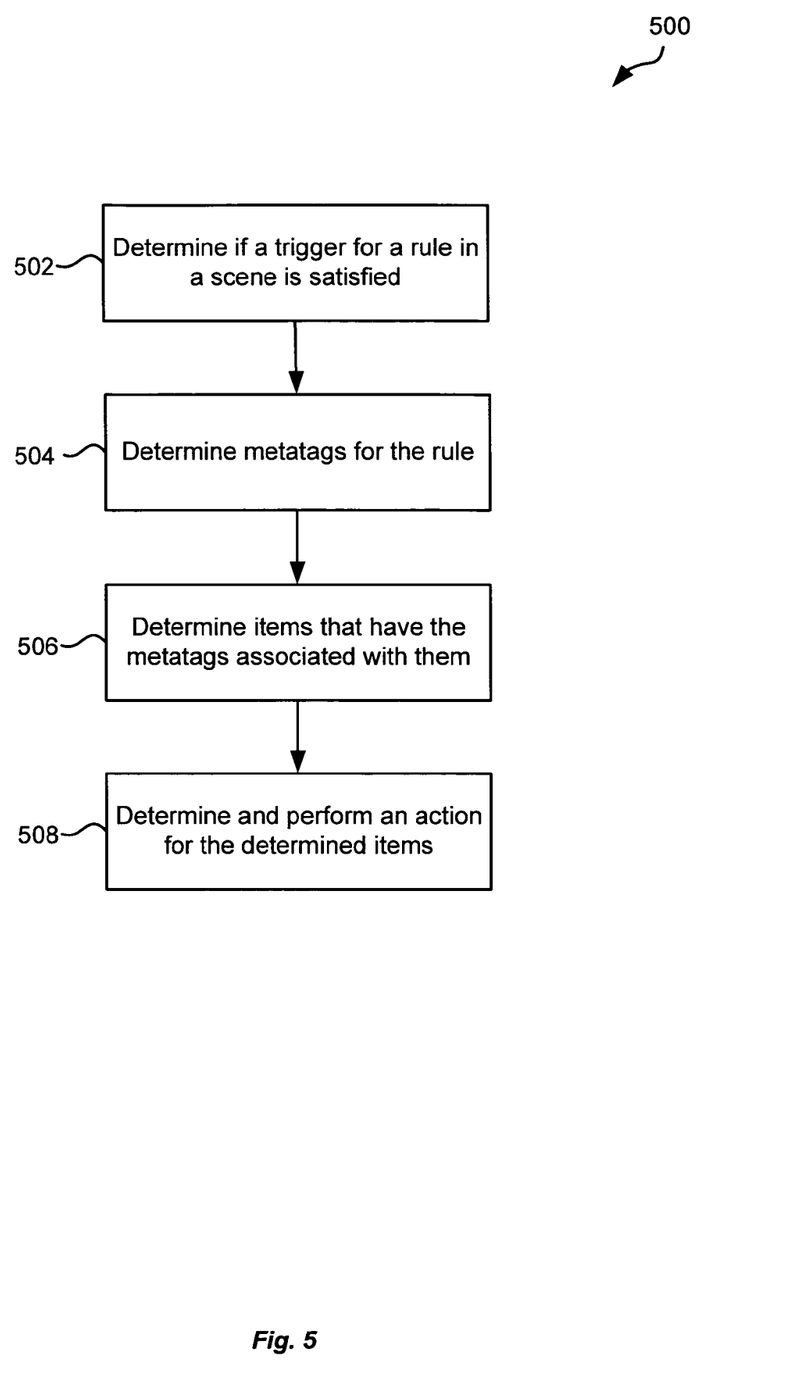
FIG. 5 shows a simplified flowchart for a method for controlling items according to one embodiment.

FIG. 5 shows a simplified flowchart 500 for a method for controlling items 108 according to one embodiment. Step 502 determines if a trigger for a rule in a scene is satisfied. For example controller 102 may monitor information to determine if triggers are satisfied. This information may be determined from location controllers 110-1, which may be monitoring information in the room. For example, a total energy usage may be monitored for a house.

Step 504 determines metatags for the rule. The rule may specify any number of metatags.

Step 506 then determines items 108 that have the metatags associated with them. This may be determined by query, such as by querying storage 102. For example, all lights designated pathway lights are queried for.

Step 508 determines and performs an action for the determined items 108. For example, controller 102 may communicate with location controller 110-1 and/or 110-2 to have actions performed with items 108.

Accordingly, particular embodiments allow items to be configured and automatically operated in certain ways. For example, metatags may be associated with devices and rules associated with metatags are used to control the items. The items do not have to be configured to operate in a certain way other than to associate a metatag with them. This allows the easy configuration of items. Also, new items may be constantly added, but do not have to go through a long configuration process. Rather, lights may be swapped out for other lights and the new lights may operate the same way as the old lights upon association with the same metatags.

In one example, a light may be situated in a location. The light may be designated as a pathway light and an emergency light. The pathway light rules may indicate that pathway lights turn on at 6:00 p.m. and stay on until 10:00 p.m. Then, the pathway lights may be dimmed until midnight, and then may be turned off. The light may be configured by associating the pathway light metatag with it. Also, the emergency light rules may indicate that the emergency light may turn on when an alarm is activated. The metatag spotlight may be associated with a light for it to turn on as an emergency light.

When a new light is connected in the location, and the metatag pathway and spotlight is associated with this new light. Instead of having to configure the light to turn on and off at certain times, the rules associated with the metatags are used to operate the light. Thus, once the light is connected and associated with the pathway metatag, then it operates as the prior light did. That is the new light pathway lights turn on at 6:00 p.m. and stays on until 10:00 p.m. Then, the new light may be dimmed until midnight, and then may be turned off. Also, the new light automatically turns on if an alarm is activated.

Accordingly, a configuration process for a light is simplified. The operation is controlled by metatags that have rules associated with them. Thus, reconfiguration of rules for the lights to automatically perform actions is not needed.

Although the description has been described with respect to particular embodiments thereof, these particular embodiments are merely illustrative, and not restrictive. For example, any control method or process may be used to control items. For example, in addition to devices, items can include non-physical applications or functional elements such as software, audio or visual content, virtual devices, etc.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

Functions can be performed in hardware, software, or a combination of both. Unless otherwise stated, functions may also be performed manually, in whole or in part. System designs can vary from those described herein. For example, other approaches may not use separate controllers and location controllers. Functions performed by a controller, location controller, item or device, or other apparatus can be integrated with one or more of the devices. In some applications it may be possible to eliminate devices, such as the location controllers, and have the functionality performed in the controller or in a controlled item or at another device or location.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

I claim:

1. A method for automatically controlling an item with a controller, the method comprising:
    receiving a metatag for the item that is connected to be controlled and operated by a controller, wherein the metatag classifies the item;
    associating the metatag with the item; and
    determining a rule that is configured for the metatag, the rule including a trigger and an action, wherein the controller is configured to automatically perform the action with the item based on the metatag that is associated with the item when the trigger is satisfied.

2. The method of claim 1, further comprising sending, using the controller, a signal to cause the item to perform the action.

3. The method of claim 1, wherein the rule is associated with a trigger, wherein the controller causes the item to perform the action when the trigger is satisfied.

4. The method of claim 1, further comprising:
    receiving the metatag for a second item to be controlled and operated; and
    automatically configuring the controller to perform the action with the second item based on the type of the item and the metatag received for the second item.

5. The method of claim 1, wherein the metatag comprises a use metatag describing how the item is used.

6. The method of claim 1, wherein the metatag comprises a location metatag describing a location where the item is connected to a network.

7. The method of claim 1, wherein the metatag comprises a connection metatag describing how the item operates.

8. The method of claim 1, further comprising:
    determining an identifier for the item; and
    determining the type of item based on the identifier; and
    automatically configuring the controller to perform the action with the item based on the type of the item and the metatag received.

9. A system configured to automatically control an item, the system comprising:
    one or more items, each item associated with at least one metatag, wherein each metatag classifies the one or more items; and
    a controller configured to automatically cause actions to be performed with the one or more items based on rules that are configure for metatags, wherein a rule for a metatag includes a trigger and an action, wherein the controller is configured to automatically perform the action with the item based on the metatag that is associated with the item when the trigger is satisfied.

10. The system of claim 9, further comprising a location controller configured to receive a communication from the controller and to cause the action to be performed with the item.

11. The system of claim 9, wherein the item is associated with a plurality of metatags, wherein the plurality of metatags taken together are used to determine an action to perform.

12. A system configured to automatically control an item with a controller, the apparatus comprising:
    one or more processors; and
    logic encoded in one or more tangible media for execution by the one or more processors and when executed operable to:
    receive a metatag for the item that is connected to be controlled and operated by a controller, wherein the metatag classifies the item;
    associate the metatag with the item; and
    determine a rule that is configured for the metatag, the rule including a trigger and an action, wherein the controller is configured to automatically perform the action with the item based on the metatag that is associated with the item when the trigger is satisfied.

13. The apparatus of claim 12, wherein the logic when executed is further operable to send, using the controller, a signal to cause the item to perform the action.

14. The apparatus of claim 12, wherein the rule is associated with a trigger, wherein the controller causes the item to perform the action when the trigger is satisfied.

15. The apparatus of claim 12, wherein the logic when executed is further operable to:
    receive the metatag for a second item to be controlled and operated; and
    automatically configure the controller to perform the action with the second item based on the type of the item and the metatag received for the second item.

16. The apparatus of claim 12, wherein the metatag comprises a use metatag describing how the item is used.

17. The apparatus of claim 12, wherein the metatag comprises a location metatag describing a location where the item is connected to a network.

18. The apparatus of claim 12, wherein the metatag comprises a connection metatag describing how the item operates.

19. The apparatus of claim 12, wherein the logic when executed is further operable to:
    determine an identifier for the item; and
    determine the type of item based on the identifier; and
    automatically configure the controller to perform the action with the item based on the type of the item and the metatag received.

* * * * *